United States Patent
Bulsara et al.

(10) Patent No.: US 11,510,148 B2
(45) Date of Patent: Nov. 22, 2022

(54) AUTONOMOUS SENSOR

(71) Applicant: Naval Information Warfare Center Pacific, San Diego, CA (US)

(72) Inventors: Adi Ratan Bulsara, San Diego, CA (US); Bruno Ando, Catania (IT); Salvatore Baglio, Catania (IT); Vincenzo Marletta, Catania (IT)

(73) Assignee: United States of America as represented by the Secretary of the Navy, Washington, DC (US)

(*) Notice: Subject to any disclaimer, the term of this patent is extended or adjusted under 35 U.S.C. 154(b) by 244 days.

(21) Appl. No.: 17/108,503

(22) Filed: Dec. 1, 2020

(65) Prior Publication Data

US 2022/0174607 A1  Jun. 2, 2022

(51) Int. Cl.
*H04W 4/00* (2018.01)
*H04W 52/02* (2009.01)
(Continued)

(52) U.S. Cl.
CPC .......... *H04W 52/0254* (2013.01); *F03G 7/08* (2013.01); *H04W 52/0229* (2013.01); *H04W 84/18* (2013.01)

(58) Field of Classification Search
CPC .......... H04W 52/0254; H04W 52/0229; H04W 84/18; F03G 7/08; Y02D 30/70
See application file for complete search history.

(56) References Cited

U.S. PATENT DOCUMENTS 10,727,394 B1   7/2020 Bulsara et al.

FOREIGN PATENT DOCUMENTS

KR   20110006884 A  *  1/2011  ............. H02N 2/183
KR   20130112662 A  * 10/2013  ............. H01L 41/125

OTHER PUBLICATIONS

B. Andò, S. Baglio, A. R. Bulsara, V. Marletta, "A bistable buckled beam based approach for vibrational energy harvesting", Sensors and Actuators A: Physical, vol. 211, pp. 153-161, 2013, http://dx.doi.org/10.1016/j.sna.2013.12.027.

(Continued)

*Primary Examiner* — Omoniyi Obayanju
(74) *Attorney, Agent, or Firm* — Naval Information Warfare Center, Pacific; Kyle Eppele; Matthew D. Pangallo (57) ABSTRACT

An autonomous sensor that includes a snap-through buckling beam, a proof mass, an ultra-low-power microcontroller unit, a wireless transmitter, a power management unit, and a power storage unit. The snap-through buckling beam produces mechanical energy. The proof mass is attached to the snap-through buckling beam. The proof mass transfers mechanical energy to two piezoelectric transducers that convert the mechanical energy into electrical energy and produce an output signal. The ultra-low-power microcontroller unit converts the output signal into output data. The wireless transmitter transfers the output data to an external device. The power management unit provides the electrical energy to the ultra-low-power microcontroller unit and the wireless transmitter. The power storage unit is rechargeable, stores electrical energy from the two piezoelectric transducers, and non-replaceable. The autonomous sensor simultaneously harvests energy and measures vibrations in an external environment.

19 Claims, 8 Drawing Sheets

(51) Int. Cl.
F03G 7/08 (2006.01)
H04W 84/18 (2009.01)

(56) References Cited

OTHER PUBLICATIONS

B. Andò, S. Baglio, A. R. Bulsara, V. Marletta, I. Medico, S. Medico, "A double piezo—snap through buckling device for energy harvesting", IEEE 17th International Conference on Solid-State Sensors, Actuators and Microsystems (Transducers & Eurosensors XXVII), pp. 43-45, Barcelona, Jun. 16-20, 2013.

B. Andò, S. Baglio, V. Marletta, and A. R. Bulsara, "A wireless sensor node powered by nonlinear energy harvester," in Proc. 13th IEEE Sensors Conf., Valencia, Spain, Nov. 2014, pp. 1583-1586.

B. Andò, S. Baglio, A. R. Bulsara, V. Marletta, and A. Pistorio, "Experimental and theoretical investigation of a nonlinear vibrational energy harvester," Proc. Eng., vol. 120, pp. 1024-1027, Jan. 2015.

B. Andò, S. Baglio, V. Marletta, E. Pergolizzi, V. Ferrari, M. Ferrari, A. R. Bulsara, "Nonlinear snap-through-buckling devices for energy harvesting from vibrations", Proceedings of the Second National Conference on Sensors, Rome Feb. 19-21, 2014, Lecture Notes in Electrical Engineering vol. 319, pp. 409-413, Springer-Verlag, 2015.

B. Andò, S. Baglio, A. R. Bulsara, V. Marletta, V. Ferrari, and M. Ferrari, "A low-cost snap-through-buckling inkjet-printed device for vibrational energy harvesting," IEEE Sensors J., vol. 15, No. 6, pp. 3209-3220, Jun. 2015.

B. Andò, S. Baglio, A. R. Bulsara, V. Marletta, A. Pistorio, "Performance Investigation of a Nonlinear Vibrational Energy Harvester with Band Limited Noise", International Instrumentation and Measurement Technology Conference, I2MTC 2016, pp. 1-5, Taipei, Taiwan, May 23-26, 2016.

B. Andò, S. Baglio, A. R. Bulsara, V. Marletta, A. Pistorio, "A Low Threshold Bistable Device for Energy Scavenging from Vibrations", IEEE Sensors Applications Symposium (SAS), pp. 1-5, Catania, Italy, Apr. 20-22, 2016.

B. Andò, S. Baglio, A. R. Bulsara, V. Marletta, and A. Pistorio, "Investigation of a nonlinear energy harvester," IEEE Trans. Instrum. Meas., vol. 66, No. 5, pp. 1067-1075, May 2017.

B. Andò, S. Baglio, V. Marletta, A. Pistorio, A. R. Bulsara, A Non Linear Energy Harvesting with asymmetry compensation. Proceedings 2017, 1(4), 581, Eurosensors 2017 Conference, Paris, France, Sep. 3-6, 2017.

B. Andò, S. Baglio, V. Marletta, A. Pistorio, and A. R. Bulsara, "Performance investigation of a nonlinear energy harvester with random vibrations and sub-threshold deterministic signals," IEEE Trans. Instrum. Meas., vol. 66, No. 5, pp. 992-1001, May 2017.

B. Andò, S. Baglio, A. Bulsara, V. Marletta, A. Pistorio, "Modeling investigation of a nonlinear vibrational energy harvester", Sensors. Proceedings of the Third National Conference on Sensors, Feb. 23-25, 2016, Rome, Italy, Siciliano P.,Di Natale C.,Baldini F.,Ando B.,Marrazza G. (Eds), Lecture Notes in Electrical Engineering vol. 431, pp. 249-257, Springer-Verlag, 2018.

B. Andò, S. Baglio, S. Graziani, V. Marletta, A. Pistorio, A. R. Bulsara, Modeling of a Low Threshold Bistable Device for Energy Scavenging, 2018 IEEE International Instrumentation and Measurement Technology Conference (I2MTC), Houston, TX, USA, May 14-17, 2018.

B. Andò, S. Baglio, A. R. Bulsara, and V. Marletta, "Investigation of a nonlinear vibrational energy harvester in the stochastic resonance regime," Proceedings, vol. 2, No. 13, p. 1092, 2018.

B. Andò, S. Baglio, V. Marletta, A. Pistorio, and A. R. Bulsara, "A measurement methodology for the characterization of a compensated nonlinear energy harvester for vertical operation," IEEE Trans. Instrum. Meas., vol. 68, No. 8, pp. 3032-3041, Aug. 2019.

B. Andò, S. Baglio, V. Marietta, and A. R. Bulsara, "Modeling a nonlinear harvester for low energy vibrations," IEEE Trans. Instrum. Meas., vol. 68, No. 5, pp. 1619-1627, May 2019.

B. Andò, S. Baglio, V. Marletta, A. Pistorio, and A. R. Bulsara, "A low-threshold bistable device for energy scavenging from wideband mechanical vibrations," IEEE Trans. Instrum. Meas., vol. 68, No. 1, pp. 280-290, Jan. 2019.

B. Andò, R. La Rosa, S. Baglio, A. R. Bulsara, V. Marletta, A nonlinear harvester to scavenge energy from rotational motion, IEEE I2MTC International Conf., Auckland, New Zealand, May 20-23, 2019.

* cited by examiner

AUTONOMOUS SENSOR

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND

Energy harvesting is used to capture, store, and, in some instances, power small devices or prolong battery life by collecting unused energy from environmental sources. For example, energy can be harvested from ambient vibrations, wind, heat, or solar energy. This energy can then be used to power small electronic devices, such as sensors, wearable electronics, or any other device where the application necessitates a self-powered device or an extended battery life. The source of the energy being harvested and the design of the device depend on the application of the device and the environment in which that device is being used.

DESCRIPTION OF THE DRAWINGS

Features and advantages of examples of the present disclosure will be apparent by reference to the following detailed description and drawings, in which like reference numerals correspond to similar, but in some instances, not identical, components. Reference numerals or features having a previously described function may or may not be described in connection with other drawings in which they appear.

DETAILED DESCRIPTION

Generally, devices that are used as an energy harvester include batteries. The battery charge can be maintained by scavenging energy from the environment. In particular, mechanical vibrations have been a focus for energy harvesting devices due to how frequently the vibrations are found in the environment. Linear resonant mechanical structures have been used to harvest mechanical vibrations when the vibrations are concentrated very close to the device resonance frequency. However, since mechanical vibrations have a wide frequency spectrum and amplitude, linear resonant mechanical structures are not preferred devices for energy harvesting applications.

To address this shortcoming, nonlinear structures have been used with a wide range of frequencies. One example of the nonlinear structures is a flexible beam in a snap-through buckling (STB) configuration. Depending on the configuration and the material of the STB beam, the nonlinear STB structures can operate at a range of different frequencies. Although nonlinear STB devices have had more success harvesting mechanical vibrational energy, the input acceleration has to overcome a threshold value in order for a switching event to occur in the STB beam. Therefore, the application of nonlinear STB structures affects the configuration of the device in order to set the threshold value of the STB beam.

In the disclosure herein, the device is configured to have a deterministic switching threshold that allows the device to be used simultaneously as an energy harvester and a sensor. This is accomplished in two different ways. First, in this example, the deterministic input signal alone does not cause a switching event in the device. However, when noise is present along with the deterministic input signal, a switching event occurs, which generates energy that can be harvested. In addition, because the deterministic input signal with noise causes the STB beam to switch stable states, the device can also be used as a sensor in addition to an energy-harvesting device. In some instances, the noise alone can cause a switching event at a lower frequency than the combination of noise and the deterministic input signal, which can also be used to harvest energy. In this example, the amplitude and frequency of the deterministic input signal are known and the piezoelectric output voltage can be monitored for when a switching event occurs to determine whether the deterministic input signal is present. As a result, the device can function as a fully autonomous sensor without a need to replace a power storage component in the device.

In another example, if the mechanical vibration level is known and constant, the device can be used to detect and estimate a deterministic input signal without noise based on a switching event. In this example, the deterministic input signal alone provides enough energy to cause a switching event in the device. When the deterministic input signal reaches an amplitude sufficient to lead to a switching event in the device, the frequency can be estimated by monitoring the piezoelectric output voltage at specific time instants where the peaks have occurred. In this example, if noise is present, the noise can be used to harvest additional energy, but is not necessary to assist the detection of the deterministic input signal. This also allows the device to function as a fully autonomous sensor that can harvest energy and act as a sensor without a need to replace a power storage component in the device.

The disclosure herein describes an autonomous sensor that includes a snap-through buckling beam, a proof mass, an ultra-low-power microcontroller unit, a wireless transmitter, a power management unit, and a power storage unit. The snap-through buckling beam produces mechanical energy. The proof mass is attached to the snap-through buckling beam. The proof mass transfers mechanical energy to two piezoelectric transducers that convert the mechanical energy into electrical energy and produce an output signal. The ultra-low-power microcontroller unit converts the output signal into output data. The wireless transmitter transfers the output data to an external device. The power management unit provides the electrical energy to the ultra-low-power microcontroller unit and the wireless transmitter. The power storage unit is rechargeable, stores electrical energy from the two piezoelectric transducers, and is non-replaceable. The autonomous sensor simultaneously harvests energy and acts as a sensor by measuring vibrations in an external environment.

Figure 1:
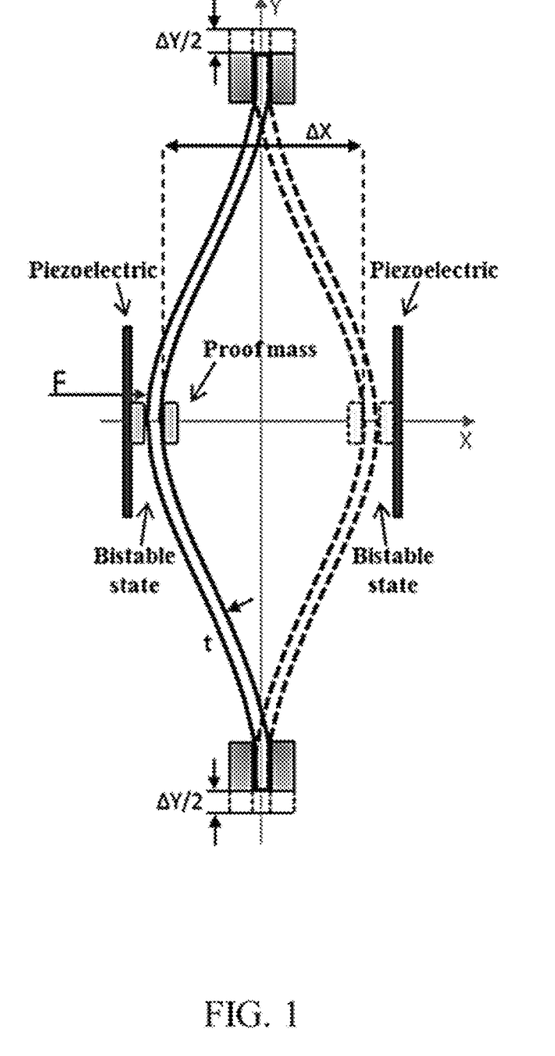
FIG. 1 is an example of a nonlinear bistable device within the autonomous sensor described herein.

Referring now to FIG. 1, an example of a nonlinear bistable device used in the autonomous sensor is shown. The nonlinear bistable device includes a snap-through buckling beam, two piezoelectric transducers, and a proof mass. In particular, the snap-through buckling beam that exhibits a bistable state in response to perpendicular external stress. The snap-through buckling beam snaps between the two stable equilibrium states along the X-axis shown in FIG. 1 when an external mechanical force, stemming from external vibrations is applied to the snap-through buckling beam. The ΔX indicates the distance between the two stable states of the snap-through buckling beam. The ΔX varies depending on the size of the beam, the amount of precompression applied to the beam, and the material of the beam. The tin FIG. 1 indicates the snap-through buckling beam thickness. In an example, the snap-through buckling beam is a polyethelyne terephthalate (PET) ribbon.

As shown in FIG. 1, the snap-through buckling beam is anchored between two clamps that provide a precompression illustrated by the ΔY/2. The clamps may be arranged in a fixed-fixed configuration. The precompression of the snap-through buckling beam depends, in part, on the material of the beam and the size of the beam. The precompression is directly related to the energy required for the beam to switch stable states. As the precompression increases, the amount of force required to cause the beam to switch stable states also increases. In an example, the precompression of a PET ribbon snap-through buckling beam has a minimum precompression that produces a separation between stable states satisfying the following formula:

$$Q = \frac{\Delta X/2}{t} > 2.31$$

where Q is the minimum precompression that produces a separation between stable states, t is a thickness of the snap-through buckling beam, and ΔX is a separation distance between stable states of the snap-through buckling beam. In an example, the snap-through buckling beam can have a precompression of about 1 mm.

The snap-through buckling beam is specifically configured to have a deterministic switching threshold based on the particular application. In one example, the snap-through buckling beam has a deterministic switching threshold that switches configuration when a deterministic input signal generates vibrations that are transferred to the device in the presence of noise. More specifically, the snap-through buckling beam has a deterministic switching threshold that is greater than the deterministic input signal used to measure the vibrations in the external environment. The deterministic input signal has an amplitude below the deterministic switching threshold of the snap-through buckling beam. However, when the deterministic input signal generates vibrations that are transferred to the device in the presence of band-limited random noise, the snap-through buckling beam switches stable states. The band-limited random noise together with the deterministic input signal provides a force ("F" shown in FIG. 1) having an amplitude larger than the deterministic switching threshold in the out-of-plane direction of the snap-through buckling beam. In this example, the band-limited random noise has a frequency greater than the deterministic switching frequency of the snap-through buckling beam. In this example, the band-limited random noise alone may or may not cause a switching event in the snap-through buckling beam. If band-limited random noise alone does cause a switching event, it provides additional energy for the autonomous sensor to harvest. In a specific example, the deterministic input signal may have a frequency ranging from about 0.1 Hz to about 10 Hz and the band-limited random noise may range from greater than 10 Hz to about 100 Hz.

In another example, the snap-through buckling beam has a deterministic switching threshold that switches configuration only when vibrations from the deterministic input signal are transferred to the device. Specifically, the snap-through buckling beam has a deterministic switching threshold that is less than the deterministic input signal generating the vibrations in the external environment. In this example, the deterministic input signal has an amplitude above the deterministic switching threshold of the snap-through buckling beam. Therefore, when the deterministic input signal is present, the snap-through buckling beam switches stable states. The deterministic input signal provides a force ("F" shown in FIG. 1) having an amplitude larger than the deterministic switching threshold in the out-of-plane direction of the snap-through buckling beam. In this example, there may or may not be band-limited random noise present depending on the application. If band-limited random noise is present, it provides additional energy for the autonomous sensor to harvest.

Referring back to FIG. 1, the nonlinear bistable device also includes a proof mass. During each switching event of the snap-through buckling beam from one stable state to the other, the proof mass on the beam hits one of the piezoelectric transducers at the stable minima of the underlying potential energy function of the snap-through buckling beam causing the transducer to oscillate at the natural frequency of the transducers. The proof mass is located in the middle of the snap-through buckling beam as shown in FIG. 1. The proof mass size and weight may vary depending on the size of the nonlinear bistable device, the application of the nonlinear bistable device, and operative range of the nonlinear bistable device. The proof mass may be any known material suitable for a particular application.

In FIG. 1, the two piezoelectric transducers convert the mechanical energy from the external environment into electrical energy when the transducers oscillate at a natural frequency. In particular, the two piezoelectric transducers convert the mechanical energy from the snap-through buckling beam into electrical energy along with producing an output signal for the ultra-low-power microcontroller unit. The piezoelectric transducers are positioned so the proof mass strikes the transducers at the stable minima of the underlying potential energy function of the snap-through buckling beam. The piezoelectric transducers may be any known piezoelectric transducers that are capable of converting a sufficient amount of mechanical energy into electrical energy to power the ultra-low-power microcontroller unit and the wireless transmitter.

In addition, the autonomous sensor includes an ultra-low-power microcontroller unit. The ultra-low-power microcontroller unit acquires the output signal produced by the piezoelectric transducers and converts the output signal into output data. In an example, the ultra-low power microcontroller unit measures the output of the piezoelectric transducers, calculates the root means square voltage, $V_{RMS}$, and determines the level of input vibrations superimposed on the deterministic input signal (i.e., the signal and noise level data). In another example, the ultra-low power microcontroller unit measures the output of the piezoelectric transducers, calculates the root means square voltage, $V_{RMS}$, and provides the $V_{RMS}$ data as the output data. In either example, the $V_{RMS}$ calculation can be accomplished by implementing a threshold algorithm to the ultra-low-power microcontroller unit. The $V_{RMS}$ data or the signal and noise level data generated can then be provided to the wireless transmitter as output data to transfer to an external source. Furthermore, the ultra-low-power microcontroller unit uses the least amount of power possible to function, but is not limited to a specific amount of power usage.

The wireless transmitter is powered by the power management unit and used to transfers the output data to an external device. The external device can be any external device that is capable of receiving the output data from the wireless transmitter. In some examples, the external device is also capable of transmitting the output data to another source. For example, the external device may be an external node or a computer processor. Some examples of the wireless transmitter include a 2.4 GHz wireless node, an RF transmitter, or an optical transmitter. In an example, the wireless transmitter operates with an amount of power equal to or less than 100 microwatts in the autonomous sensor.

The autonomous sensor further includes a power management unit. The power management unit provides the electrical energy to an ultra-low-power microcontroller unit, a wireless transmitter and, in some instances, the conditioning electronics. Additionally, the power management unit powers the entire onboard electronics of the device without any supplemental power supply in the autonomous sensor. In an example, the power management unit integrates a low-loss full-wave bridge rectifier with a high efficiency buck converter to perform an AC to DC conversion where the amplitude of the regulated DC voltage is lower than the input AC voltage. In an example, the full-wave bridge rectifier can be implemented by diodes or MOS transistors. The voltage may be regulated specifically for particular electronic components in the autonomous sensor, such as 1.8V, 2.5V, 3.3V, and 3.6V.

A power storage unit is also included within the autonomous sensor. The power storage unit stores the electrical energy generated by the two piezoelectric transducers. The power storage unit is rechargeable and non-replaceable in the device. In an example, the power storage unit is a rechargeable battery or a capacitor. The rechargeable battery may be any rechargeable battery capable of storing enough charge to power the components on the autonomous sensor. In an example, a rechargeable battery may be added to the autonomous sensor to increase the lifespan of the autonomous sensor for a particular application. The capacitor may be any capacitor capable of storing enough electrical energy to power the entire autonomous sensor. In an example, the capacitor is a high efficiency capacitor.

In an example, the autonomous sensor can also include conditioning electronics. The conditioning electronics amplify or attenuate the output signal generated by the two piezoelectric transducers and transmit the output signal to the ultra-low-power microcontroller unit. The conditioning electronics are powered by the power management unit. In some examples, the conditioning electronics can implement additional functionalities, such as measuring the root square means voltage by incorporating a microprocessor. An example of the conditioning electronics includes a Schmitt trigger circuit.

Figure 2:
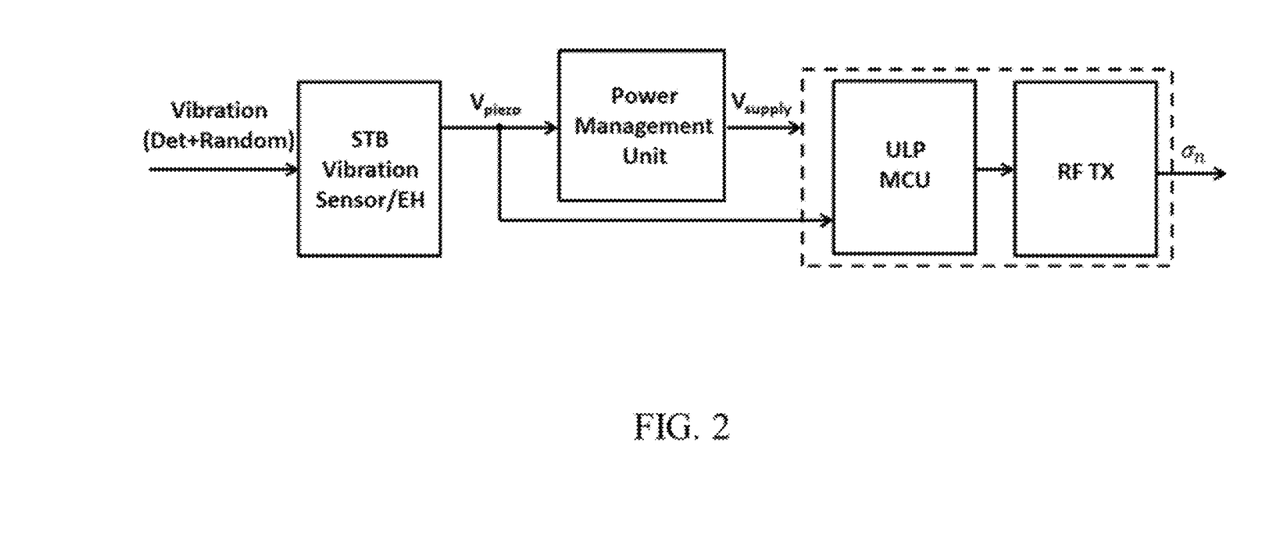
FIG. 2 is a scheme of an autonomous sensor system described herein.

Referring now to FIG. 2, a scheme of an example of an autonomous sensor system is shown. In the autonomous sensor system shown in FIG. 2, the snap-through buckling beam (STB Vibration Sensor/EH), the power management unit, the ultra-low powered microcontroller unit (ULP MCU), and the wireless transmitter (RF TX) are same components previously described herein. In the system shown in FIG. 2, environmental vibrations apply a force on the snap-through buckling beam in the form of mechanical energy. The environmental vibrations include the deterministic input signal plus the band-limited random noise (Det+Random), which causes switching events in the snap-through buckling beam. The snap-through buckling beam strikes one of the piezoelectric transducers, which converts the mechanical energy into electrical energy and transfers the electrical energy to the power management unit. The power management unit transfers the electrical energy to a power storage unit ($V_{supply}$), which is not depicted in FIG. 2. The piezoelectric transducers also output a signal, $V_{piezo}$, including the noise level, $\sigma_n$, from the switching event. At the same time, the ultra-low-power microcontroller unit is extracting and recording the output signal as data in the form of the root mean square voltage, $V_{RMS}$, from the voltage output ($V_{piezo}$) of the piezoelectric transducers and using that data to calculate and generate the signal and noise level data. The signal and noise level data is transmitted to an external device by the wireless transmitter (RF TX). Both the ultra-low power microcontroller unit and the wireless transmitter are powered, $V_{supply}$, by the power storage unit to operate.

Figure 3:
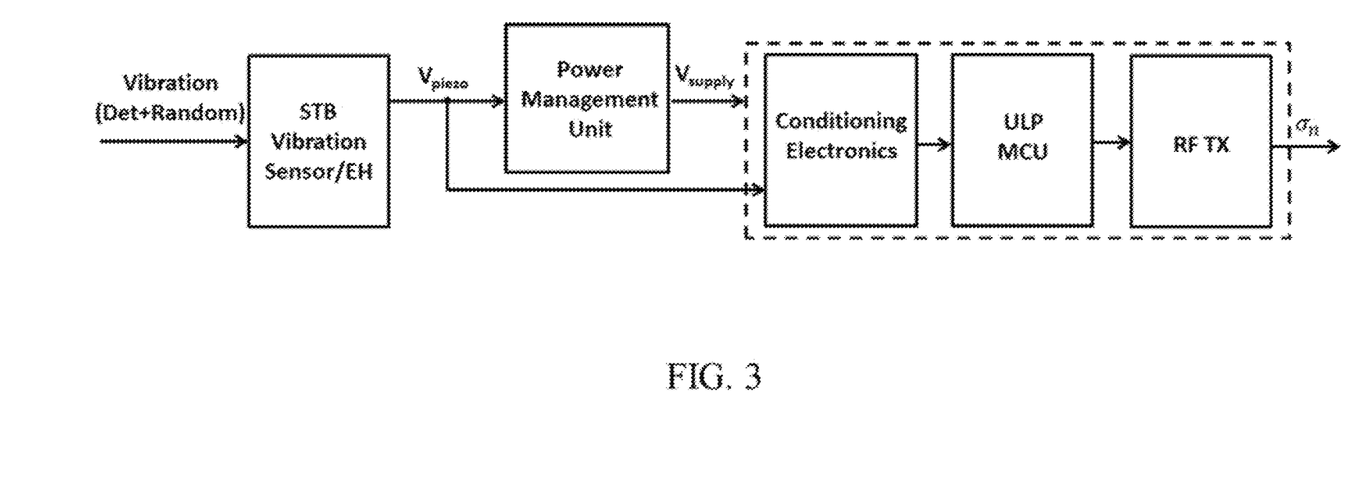
FIG. 3 is another scheme of an autonomous sensor system described herein.

Referring now to FIG. 3, another scheme of the autonomous sensor system is shown. The autonomous sensor system shown in FIG. 3 is the same as the autonomous sensor system shown in FIG. 2. However, conditioning electronics have been added to the sensor system. The conditioning electronics amplify or attenuate the signal generated by the two piezoelectric transducers and transmit the signal to the ultra-low power microcontroller unit. In this example, the conditioning electronics receive power ($V_{supply}$) via the power storage unit in order to operate.

Figure 4:
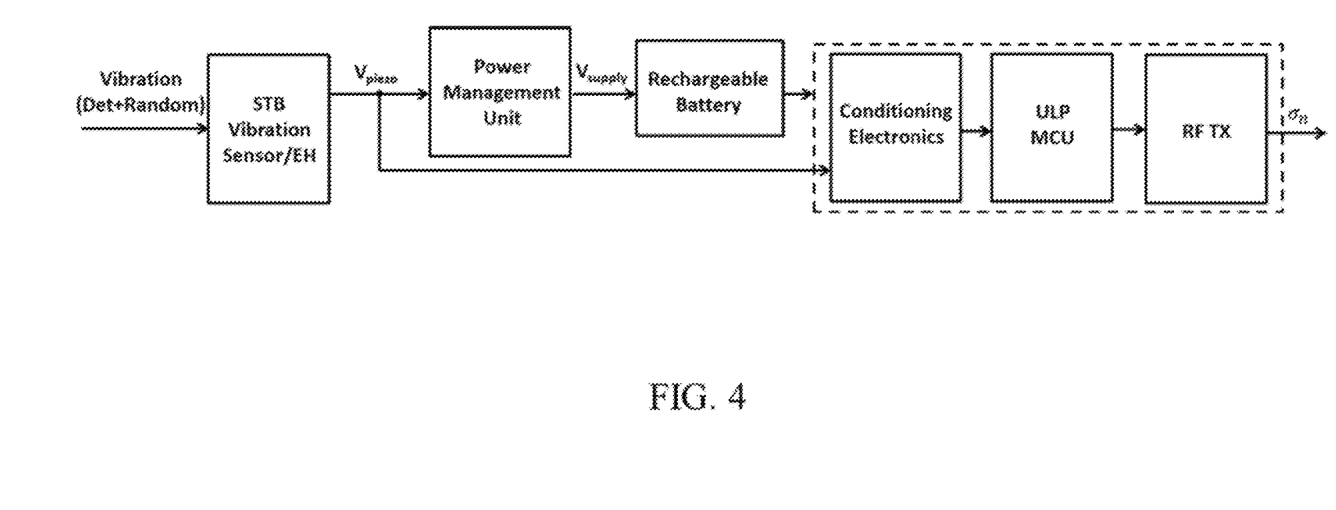
FIG. 4 is yet another scheme of an autonomous sensor system described herein.

Referring now to FIG. 4, yet another scheme of the autonomous sensor system is shown. The autonomous sensor system shown in FIG. 4 is the same as the autonomous sensor system shown in FIG. 3. However, an example of the power storage unit, a rechargeable battery, has been added to the system. In this example, the rechargeable battery provides power to the conditioning electronics, ultra-low power microcontroller unit (ULP MCU), and the wireless transmitter (RF RX). The power management system provides power ($V_{supply}$) to the rechargeable battery. In another example, the autonomous sensor system shown in FIG. 4 can function without conditioning electronics and only with a rechargeable battery as depicted in FIG. 2.

To further illustrate the present disclosure, examples are given herein. These examples are provided for illustrative purposes and are not to be construed as limiting the scope of the present disclosure.

EXAMPLES

A nonlinear bistable device was prepared for the following examples. The device had a flexible PET (Tartan™ 801) beam. The beam was 6 cm long, 1 cm wide, and 140 µm thick. A pre-compression of 1 mm was applied, leading to two opposite stable positions, 9 mm apart from each other. A magnetic proof mass of 5.3 g was attached in the central position of the beam. Two piezoelectric transducers Midè Volture V21BL were placed at the stable positions of the beam, to realize the mechanical-to-electrical conversion mechanism exploited to implement the readout strategy of the vibration sensor, as well as the energy harvesting operation. An InfraRed (IR) distance module, Pololu QTR-1A, was also used to observe the beam deflection and the number of switching events in a canonical time interval. A shaker was used that included two electromagnets WF-P34/18 driven by counter phase current signals. The shaker generates a magnetic force on the permanent magnet mass miming the target vibrations.

The two signals used to investigate the device (sinusoidal and band-limited (at 100 Hz) noise) were generated by an arbitrary waveform generator Agilent 33120A and summed through dedicated electronics. The signal used to drive the electromagnets, the IR module's output voltage, and the two piezoelectric transducer output voltages were acquired by a data acquisition board NI USB 6341 with a sampling frequency of 2 kHz. The data acquisition board was managed through virtual instrument by NI LabVIEW. In order to maximize the power transfer, a resistive load of 15 kΩ was connected to the piezoelectric transducers.

Example 1: Data Extraction from Piezoelectric Output Voltage

The ability to harvest energy with the device along with detecting and measuring wideband vibrations superimposed to a subthreshold deterministic input was evaluated. Different frequencies and amplitudes of the deterministic input were used. Increased values of the standard deviation, $\sigma_n$, of the superimposed noise (input vibrations) were also determined. In the results reported in the following, both the deterministic input and the superimposed noise generating the input vibration are represented in terms of amplitude and standard deviation of the signal generated by the waveform generator and then expressed in volts (V).

The beam switching threshold, $S_{th}$, is defined as the minimum dynamical acceleration required to switch the beam from one stable state to the other in the opposite position. In particular, three different subthreshold levels of the sinusoidal input were considered: $A_1, A_2, A_3$, being 10%, 20%, and 30% lower than the threshold, respectively. The quantity Δ defined in the following:

$$\Delta = S_{th} - A_i (i=1,2,3) \quad (1)$$

The quantity Δ represents the gap to be "filled" by the superimposed vibration, to activate the switching dynamics of the beam.

Figure 5A:
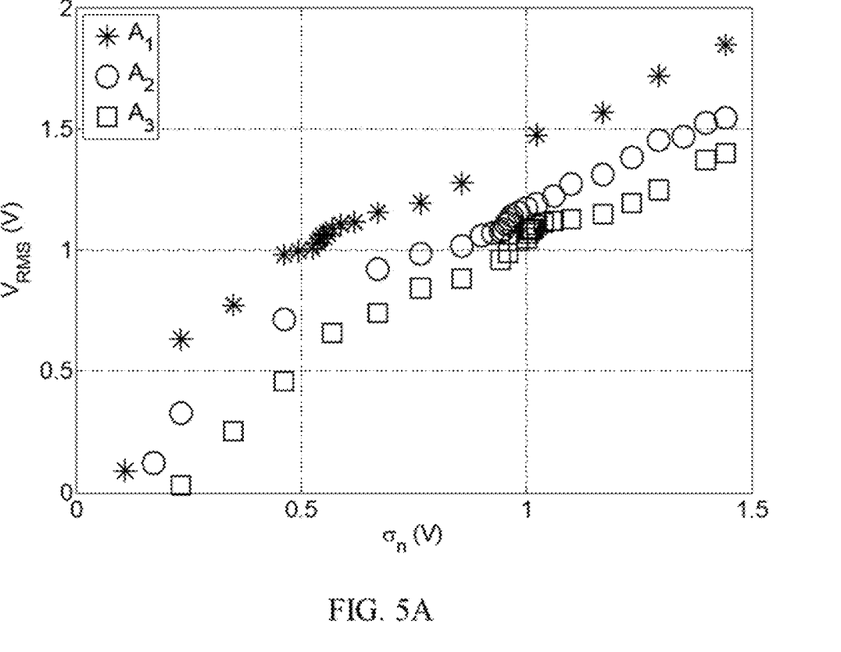
FIG. 5A is a plot of the Root Mean Square (RMS) output voltage (Y-axis, labeled "$V_{RMS}$ (V)") vs. the standard deviation of the noise level (X-axis, labeled "$\sigma_n(V)$") using an example of the nonlinear bistable device with the subthreshold sinusoidal input signal at 1 Hz with amplitudes at 10%, 20%, and 30% lower than the deterministic switching threshold.

FIG. 5A shows an example of the observed piezoelectric Root Mean Square (RMS) output voltage, $V_{RMS}$, as a function of the superimposed noise level. $\sigma_n$ is the standard deviation of the noise signal. Three amplitudes of the subthreshold sinusoidal input at 1 Hz were used, which were 10%, 20%, and 30% lower than the threshold. The results show that the RMS value of the output voltage increased with the noise level. Moreover, for a fixed noise level, the output voltage increased while decreasing the gap 4 or, equivalently, increasing the amplitude of the deterministic component. It should be observed that, for fixed $V_{RMS}$, the vibration level $\sigma_n$ is not univocally defined, since it depends on the amplitude of the deterministic input.

Figure 5B:
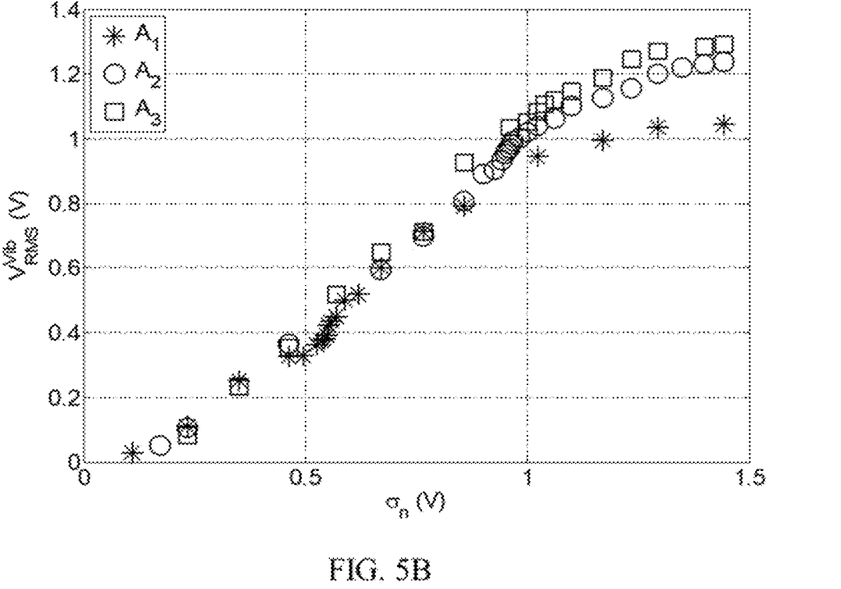
FIG. 5B is a plot of the Root Mean Square (RMS) output voltage due to the vibration superimposed on the deterministic input (Y-axis, labeled "IQ (V)") vs. the standard deviation of the noise level (X-axis, labeled "$\sigma_n(V)$") using an example of the nonlinear bistable device with the subthreshold sinusoidal input signal at 1 Hz with amplitudes at 10%, 20%, and 30% lower than the deterministic switching threshold.

The vibration level $\sigma_n$ is not defined for a fixed $V_{RMS}$ because the vibration level $\sigma_n$ depends on the amplitude of the deterministic input. In order to elucidate this issue, the contribution to the $V_{RMS}$ level, $V_{RMS}^{Vib}$, due to the vibration superimposed on the deterministic input, has been determined. FIG. 5B shows the $V_{RMS}^{Vib}$ quantity as a function of the noise level. The results show that the $V_{RMS}$ output voltage produced by the noise increased with the noise level and, at least in most of the noise range, it is independent of the amplitude of the sinusoidal input. A dependency on the deterministic input is present only for input noise vibrations greater than 1V (i.e., $\sigma_n > 1V$).

Example 2: Signal Detection Operation

As in Example 1, three different subthreshold levels of the sine input have been considered: $V_{th}$ with $V_{th}$=10%, 20%, and 30% lower than the threshold $S_{th}$. The term $V_{th}$ represents the gap ΔV to be "filled" by the superimposed noise, to switch the beam based on equation 1 above. To examine the SR regime, the signal from the IR distance module was converted to the beam displacement as previously discussed herein. The beam displacement (i.e., the number of switching events) was determined.

Figure 6:
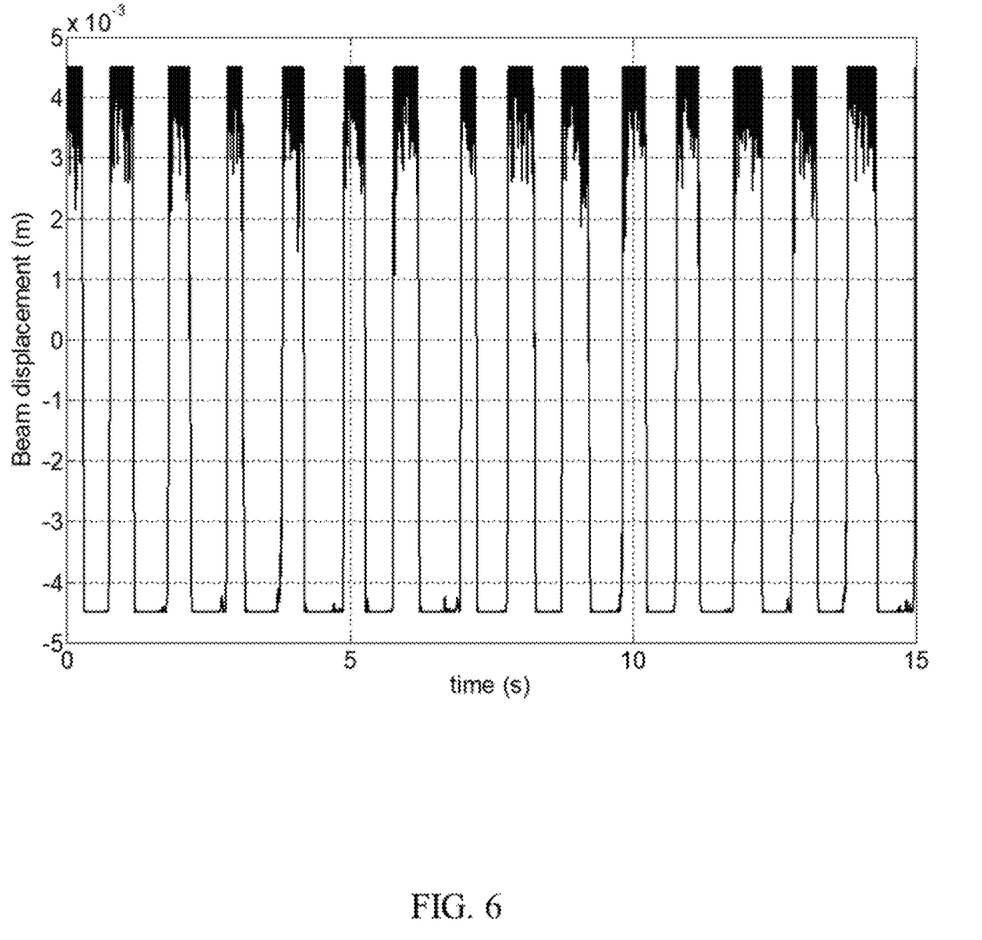
FIG. 6 is a plot of the beam displacement (Y-axis, labeled "beam displacement (m)") vs. the time (X-axis, labeled "time (s)") using an example of the nonlinear bistable device with a subthreshold sinusoidal input at 1 Hz.

In an example, the observed beam displacement between the two stable positions for one level of the superimposed noise with a subthreshold sinusoidal input at 1 Hz is shown in FIG. 6. In FIG. 6, the input has a peak-to-peak amplitude of 2.322 V, 10% lower than the threshold with the observed threshold at 2.58 Vpp and noise standard deviation of 0.589 V. In FIG. 6, the noise standard variance is sufficient to fill the gap between the periodic signal and the threshold, which led to synchronization between the beam switching and the subthreshold periodic signal.

Figure 7A:
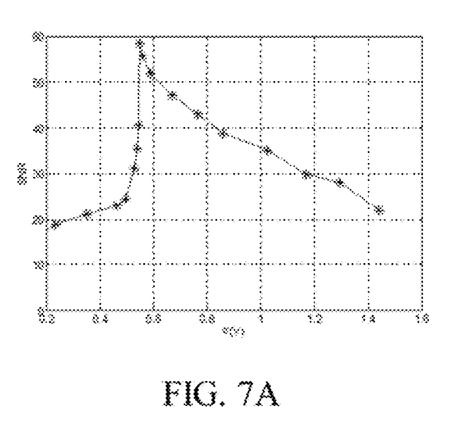
FIG. 7A-7C are three plots of the output signal to noise ratio (SNR) (Y-axis, labeled "SNR") vs. the noise standard deviation (X-axis, labeled "$\sigma(V)$") using an example of the nonlinear bistable device at 1 Hz with amplitudes at 10%, 20%, and 30% lower than the switching threshold.
Figure 7B:
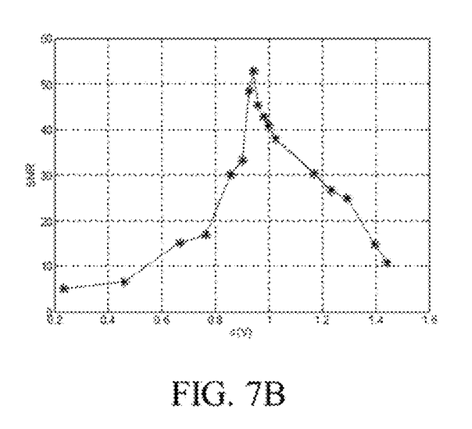
Figure 7C:
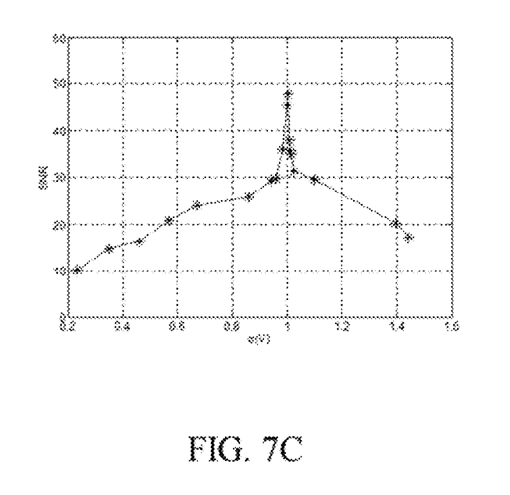

Optimal working conditions were determined by computing the signal to noise ratio (SNR) as a function of the noise standard deviation. The SNR is defined below as:

$$SNR = \frac{S_{disp@f}^{N+Sin}}{S_{disp@f}^{N}} \quad (2)$$

where $S_{disp@f}^{N+Sin}$ is the value of the Power Spectral Density (PSD) of the beam displacement, which is estimated at the periodic signal frequency, f, in case of the periodic driving signal with superimposed noise. $S_{disp@f}^{N}$ is the value of the PSD of the beam displacement at the base of the signal feature. FIG. 7 shows three plots of the noise standard deviation as a function of the SNR at 1 Hz with amplitudes at 10%, 20%, and 30% of the switching threshold. The results show that the SNR increased by increasing the noise level because of the increasing number of switching events, up to an optimal value, $\sigma_{opt}$, of the noise, which maximizes the SNR. The critical value of the noise standard deviation at which the maximum occurs can be calculated, analytically, when the system dynamics are known. Increasing the noise past the SNR maximum leads to a loss of synchronization and a decrease in the SNR.

Example 3: Energy Harvesting Performance

An evaluation of the power generated by the harvester operated in the SR regime in Example 2 is shown in Table 1. The mechanical-to-electrical power conversion efficiency η of the harvester in the SR regime has been evaluated as ratio between the electrical and mechanical powers, $P_e$ and $P_m$, respectively. $P_m$ has been evaluated by taking into account the observed mechanical behavior of the bistable beam where $$P_m = \frac{F \cdot d_s}{t_s}.$$

In the equation for $P_m$, $F=m \cdot A_{RMS}$ where F is the force applied to the proof mass, m, $A_{RMS}$ is the RMS acceleration, and $d_s$ is equal to 1 mm, which is the distance the beam travels before switching to the other stable state. The results in Table 1 show the energy conversion efficiency increases with the frequency, but decreases with decreasing amplitude of the deterministic input.

TABLE 1

Electrical power generated and power conversion efficiency.

| Frequency | ΔV = 10% $V_{th}$ | | | ΔV = 20% $V_{th}$ | | | ΔV = 30% $V_{th}$ | | |
|---|---|---|---|---|---|---|---|---|---|
| (Hz) | $P_m$ (W) | $P_e$ (W) | η % | $P_m$ (W) | $P_e$ (W) | η % | $P_m$ (W) | $P_e$ (W) | η % |
| 1 | 1.24e−3 | 82.46e−6 | 6.65 | 1.21e−3 | 76.73e−6 | 6.34 | 1.19e−3 | 73.18e−6 | 6.14 |
| 3 | 1.89e−3 | 222.5e−6 | 11.79 | 1.81e−3 | 178.5e−6 | 9.86 | 1.80e−3 | 153.9e−6 | 8.56 |
| 5 | 2.23e−3 | 296.2e−6 | 13.30 | 2.17e−3 | 249.1e−6 | 11.47 | 2.12e−3 | 221.7e−6 | 10.44 |

Figure 8A:
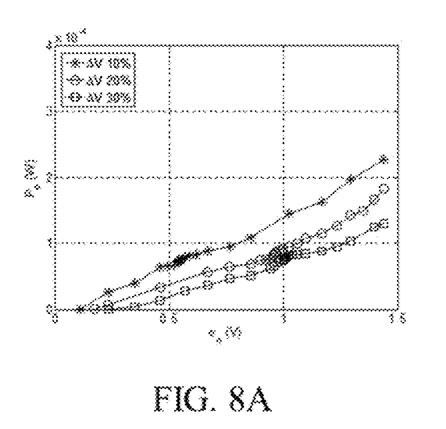
FIG. 8A-8C are three plots of the electrical power (Y-axis, labeled "$P_e$ (W)") vs. the noise standard deviation (X-axis, labeled "$\sigma(V)$") using an example of the nonlinear bistable device at amplitudes at 10%, 20%, and 30% lower than the switching threshold at 1 Hz, 3 Hz, and 5 Hz.
Figure 8B:
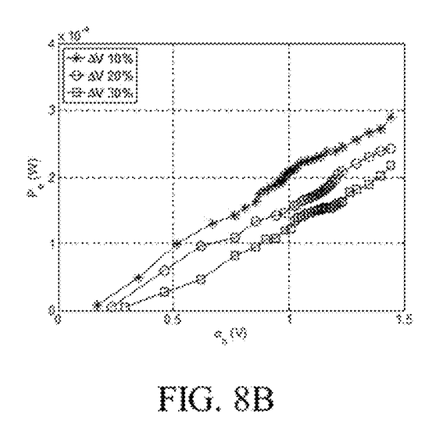
Figure 8C:
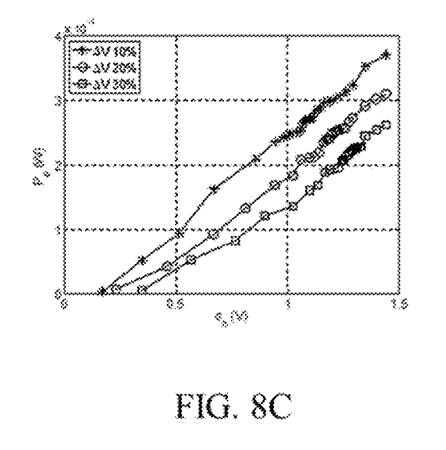

The power as a function of noise level was also reviewed in FIG. 8. The power increases monotonically with the noise level and decreases while increasing the gap, ΔV, between the system threshold and the amplitude of the deterministic input. Moreover, the generated power increases with the frequency. FIG. 8A-8C shows the electrical power, $P_e$, as a function of the noise standard deviation, $\sigma_n$, for the three considered levels of the periodic input at 1 Hz (FIG. 8A), 3 Hz (FIG. 8B) and 5 Hz (FIG. 8C). The results show that the efficiency increased monotonically with the noise level following the electric power trend. The efficiency decreases with the amplitude of the periodic input because of the lower number of switching events. Moreover, the power conversion efficiency increases with the input signal frequency.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of a list should be construed as a de facto equivalent of any other member of the same list merely based on their presentation in a common group without indications to the contrary.

Unless otherwise stated, any feature described herein can be combined with any aspect or any other feature described herein.

Reference throughout the specification to "one example", "another example", "an example", means that a particular element (e.g., feature, structure, and/or characteristic) described in connection with the example is included in at least one example described herein, and may or may not be present in other examples. In addition, the described elements for any example may be combined in any suitable manner in the various examples unless the context clearly dictates otherwise.

The ranges provided herein include the stated range and any value or sub-range within the stated range. For example, a range from about 0.1 Hz to about 10 Hz should be interpreted to include not only the explicitly recited limits of from about 0.1 Hz to about 10 Hz, but also to include individual values, such as 3 Hz, 7 Hz, 9 Hz, etc., and sub-ranges, such as from about 5 Hz to about 9 Hz, etc.

In describing and claiming the examples disclosed herein, the singular forms "a", "an", and "the" include plural referents unless the context clearly dictates otherwise.

What is claimed is:

1. An autonomous sensor, comprising:
   a snap-through buckling beam, wherein the snap-through buckling beam produces mechanical energy;
   a proof mass, wherein the proof mass is attached to the snap-through buckling beam and transfers the mechanical energy to two piezoelectric transducers that convert the mechanical energy into electrical energy and produce an output signal;
   an ultra-low power microcontroller unit; wherein the ultra-low-power microcontroller unit converts the output signal into output data;
   a wireless transmitter, wherein the wireless transmitter transfers the output data to an external device;
   a power management unit, wherein the power management unit provides the electrical energy to the ultra-low-power microcontroller unit and the wireless transmitter;
   a power storage unit, wherein the power storage unit is rechargeable, stores electrical energy from the two piezoelectric transducers, and is non-replaceable; and
   wherein the autonomous sensor simultaneously harvests energy and measures vibrations in an external environment.

2. The autonomous sensor of claim 1, wherein the snap-through buckling beam is a polyethelyne terephthalate ribbon.

3. The autonomous sensor of claim 2, wherein the snap-through buckling beam has a minimum precompression that produces a separation between stable states satisfying the following formula:

$$Q = \frac{\Delta X/2}{t} > 2.31$$

where Q is the minimum precompression that produces a separation between stable states, t is a thickness of the snap-through buckling beam, and ΔX is a separation distance between stable states of the snap-through buckling beam.

4. The autonomous sensor of claim 1, wherein the snap-through buckling beam has a deterministic switching threshold that is greater than a deterministic input signal generating vibrations in the external environment.

5. The autonomous sensor of claim 4, wherein the autonomous sensor is operated in an environment with band-limited random noise.

6. The autonomous sensor of claim 5, wherein the band-limited random noise has a frequency greater than the deterministic switching threshold of the snap-through buckling beam.

7. The autonomous sensor of claim 1, wherein the wireless transmitter operates with an amount of power equal to or less than 100 microwatts.

8. The autonomous sensor of claim 1 further including conditioning electronics, wherein the conditioning electronics amplify or attenuate the output signal generated by the two piezoelectric transducers and transmit the output signal to the ultra-low-power microcontroller unit.

9. The autonomous sensor of claim 1, wherein the snap-through buckling beam has a deterministic switching threshold that is less than a deterministic input signal generating vibrations in the external environment.

10. An autonomous sensor, consisting of:
- a snap-through buckling beam, wherein the snap-through buckling beam produces mechanical energy;
- a proof mass, wherein the proof mass is attached to the snap-through buckling beam and transfers the mechanical energy to two piezoelectric transducers that convert the mechanical energy into electrical energy and produce an output signal;
- an ultra-low power microcontroller unit; wherein the ultra-low-power microcontroller unit converts the output signal into output data;
- a wireless transmitter, wherein the wireless transmitter transfers the output data to an external device;
- a power management unit, wherein the power management unit stores the electrical energy from the piezoelectric transducers and provides the electrical energy to the ultra-low-power microcontroller unit and the wireless transmitter;
- conditioning electronics, wherein the conditioning electronics amplify or attenuate the output signal generated by the two piezoelectric transducers and transmit the output signal to the microcontroller unit;
- a power storage unit, wherein the power storage unit is rechargeable, stores electrical energy from the two piezoelectric transducers, and is non-replaceable; and
- wherein the autonomous sensor simultaneously harvests energy and measures vibrations in an external environment.

11. An autonomous sensor system, comprising:
- a snap-through buckling beam, wherein the snap-through buckling beam converts vibrations in an external environment into mechanical energy;
- a proof mass, wherein the proof mass is attached to the snap-through buckling beam and transfers the mechanical energy to two piezoelectric transducers that convert the mechanical energy into electrical energy and produce an output signal;
- an ultra-low power microcontroller unit; wherein the ultra-low-power microcontroller unit converts the output signal into output data;
- a wireless transmitter, wherein the wireless transmitter transfers the output data to an external device;
- a power management unit, wherein the power management unit stores the electrical energy from the piezoelectric transducers and provides the electrical energy to the ultra-low-power microcontroller unit and the wireless transmitter;
- a power storage unit, wherein the power storage unit is rechargeable, stores electrical energy from the two piezoelectric transducers, and is non-replaceable; and
- wherein the autonomous sensor system simultaneously harvests energy and measures vibrations in an external environment.

12. The autonomous sensor system of claim 11, wherein the snap-through buckling beam is a Polyethelyne terephthalate ribbon.

13. The autonomous sensor system of claim 12, wherein the snap-through buckling beam has a minimum precompression that produces a separation between stable states satisfying the following formula:

$$Q = \frac{\Delta X/2}{t} > 2.31$$

where Q is the minimum precompression that produces a separation between stable states, t is a thickness of the snap-through buckling beam, and ΔX is a separation distance between stable states of the snap-through buckling beam.

14. The autonomous sensor system of claim 11, wherein the snap-through buckling beam has a deterministic switching threshold that is greater than a deterministic input signal used to measure the vibrations in the external environment.

15. The autonomous sensor system of claim 14, wherein the autonomous sensor is operated in an environment with band-limited random noise.

16. The autonomous sensor system of claim 15, wherein the band-limited random noise has a frequency greater than a deterministic switching threshold of the snap-through buckling beam.

17. The autonomous sensor system of claim 11, wherein the wireless transmitter operates with an amount of power equal to or less than 100 microwatts.

18. The autonomous sensor system of claim 11 further including conditioning electronics, wherein the conditioning electronics amplify or attenuate the output signal generated by the two piezoelectric transducers and transmit the output signal to the ultra-low-power microcontroller unit.

19. The autonomous sensor of claim 11, wherein the snap-through buckling beam has a deterministic switching threshold that is less than a deterministic input signal used to measure the vibrations in the external environment.

* * * * *